US009846346B2

(12) United States Patent
Fichet et al.

(10) Patent No.: US 9,846,346 B2
(45) Date of Patent: Dec. 19, 2017

(54) RECONFIGURABLE COLOUR DISPLAYS

(71) Applicant: FLEXENABLE LIMITED, Cambridge (GB)

(72) Inventors: Guillaume Fichet, Cambridge (GB); William Reeves, Cambridge (GB)

(73) Assignee: FLEXENABLE LIMITED, Cambridge (GB)

( * ) Notice: Subject to any disclaimer, the term of this patent is extended or adjusted under 35 U.S.C. 154(b) by 0 days.

(21) Appl. No.: 14/906,740

(22) PCT Filed: Jul. 21, 2014

(86) PCT No.: PCT/EP2014/065600
§ 371 (c)(1),
(2) Date: Jan. 21, 2016

(87) PCT Pub. No.: WO2015/011080
PCT Pub. Date: Jan. 29, 2015

(65) Prior Publication Data
US 2016/0161819 A1 Jun. 9, 2016

(30) Foreign Application Priority Data
Jul. 22, 2013 (GB) .................................. 1313065.3

(51) Int. Cl.
*G02B 26/00* (2006.01)
*G02B 26/08* (2006.01)
(Continued)

(52) U.S. Cl.
CPC ........ *G02F 1/167* (2013.01); *G02F 1/133514* (2013.01); *G02F 2202/28* (2013.01)

(58) Field of Classification Search
USPC ................ 359/237, 242, 265–267, 270–273, 359/290–292, 295, 296, 298, 315, (Continued)

(56) References Cited

U.S. PATENT DOCUMENTS 7,190,504 B2 * 3/2007 Sugiyama ......... G02F 1/133555
349/104
2012/0086323 A1 4/2012 Somers et al.
(Continued)

OTHER PUBLICATIONS

Written Opinion of the International Searching Authority of PCT/EP2014/065600 dated Sep. 16, 2014.
(Continued)

*Primary Examiner* — Brandi Thomas
(74) *Attorney, Agent, or Firm* — Sughrue Mion, PLLC

(57) ABSTRACT

A technique, comprising: providing a pixelated display unit comprising an array of pixels, wherein the optical output for each pixel is independently controllable; applying a first color filter overlay to a viewing surface of said pixelated display unit, said first color filter overlay defining a first color pattern including one or more areas of a single color continuously extending over a plurality of pixels; operating said pixelated display unit to produce regions of differing brightnesses within said first color pattern; peeling said first color filter overlay from said viewing surface of said display unit; applying a second color filter overlay to said viewing surface of said display unit, said second color filter overlay defining a second color pattern including one or more areas of a single color continuously extending over a plurality of pixels; and operating said pixelated display unit to produce regions of differing brightnesses within said second color pattern.

14 Claims, 3 Drawing Sheets

Figure 1:
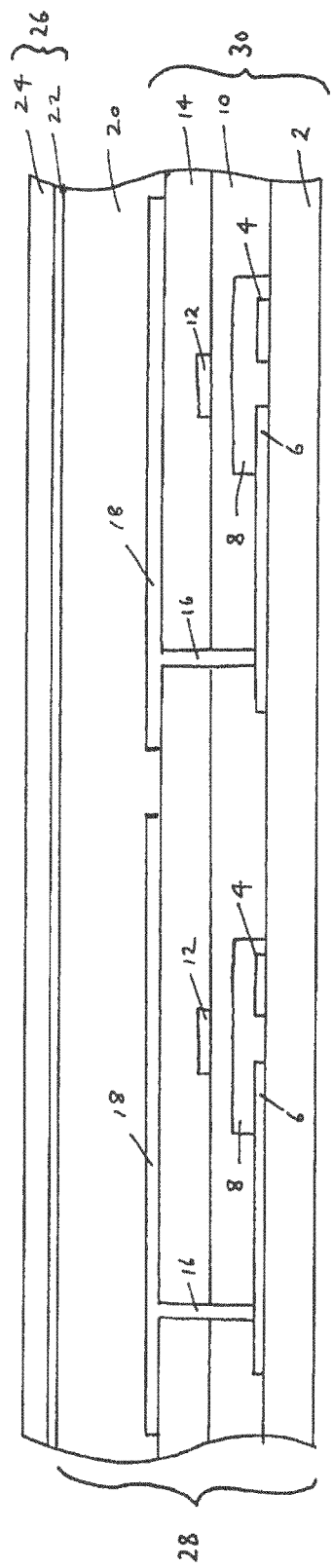

(51) Int. Cl.
  *G02F 1/29* (2006.01)
  *G02F 1/167* (2006.01)
  *G02F 1/1335* (2006.01)

(58) Field of Classification Search
  USPC .................................................. 359/321–323
  See application file for complete search history.

(56) References Cited

U.S. PATENT DOCUMENTS

2013/0088769 A1* 4/2013 Fujishiro ................. G02F 1/167
 359/296
2016/0048054 A1* 2/2016 Danner ................... G02F 1/167
 359/274

OTHER PUBLICATIONS

International Search Report of PCT/EP2014/065600 dated Sep. 16, 2014.

* cited by examiner

RECONFIGURABLE COLOUR DISPLAYS

CROSS REFERENCE TO RELATED APPLICATIONS

This is a National Stage of International Application No. PCT/EP2014/065600 filed Jul. 21, 2014, claiming priority based on British Patent Application No. 1313065.3 filed Jul. 22, 2013, the contents of all of which are incorporated herein by reference in their entirety.

One technique for producing reconfigurable colour displays is to include an ordered array of primary colour filters in a pixelated display device comprising an array of independently controllable pixels. The array of pixels are arranged into groups of pixels, wherein each pixel of each group is associated with a respective one of the primary colour filters (red, blue or green). Different colour outputs are achieved by varying the relative brightness of the pixel outputs within a group of pixels for one or more groups of pixels.

There has been identified the challenge of providing an alternative technique for providing reconfigurable colour displays. It is an aim of the present invention to meet this challenge.

There is hereby provided a method, comprising: providing a pixelated display unit comprising an array of pixels, wherein the optical output for each pixel is independently controllable; applying a first colour filter overlay to a viewing surface of said pixelated display unit, said first colour filter overlay defining a first colour pattern including one or more single colour areas each covering a plurality of pixels; operating said pixelated display unit to produce regions of differing brightnesses within said first colour pattern; peeling said first colour filter overlay from said viewing surface of said display unit; applying a second colour filter overlay to said viewing surface of said display unit, said second colour filter overlay defining a second colour pattern including one or more single colour areas each covering a plurality of pixels; and operating said pixelated display unit to produce regions of differing brightnesses within said second colour pattern.

In one embodiment, said first and second colour patterns differ in colour for one or more pixels.

There is also hereby provided a method, comprising: providing a pixelated display unit comprising an array of pixels, wherein the optical output for each pixel is independently controllable; applying a first colour filter overlay to a viewing surface of said pixelated display unit, said first colour filter overlay defining a first colour pattern; operating said pixelated display unit to produce regions of differing brightnesses within said first colour pattern; peeling said first colour filter overlay from said viewing surface of said display unit; applying a second colour filter overlay to said viewing surface of said display unit, said second colour filter overlay defining a second colour pattern, wherein said first and second colour patterns differ in colour for one or more pixels; and operating said pixelated display unit to produce regions of differing brightnesses within said second colour pattern.

According to one embodiment, operating said pixelated display unit to produce regions of differing brightness within said colour patterns comprises: operating said pixelated display unit to change the brightness of at least one region of a colour pattern relative to at least one other region of the same colour pattern.

According to one embodiment, said pixelated display unit comprises a monochromic display unit.

According to one embodiment, applying said colour filter overlays to the viewing surface of said pixelated display units comprises applying the colour filters overlays to the viewing surface using an adhesive.

According to one embodiment, the colour filter overlays comprise flexible plastic films According to one embodiment, the force required to peel said first colour filter overlay from said pixelated display unit is no more than about 1 g per mm.

There is also hereby provided a device, comprising: a pixelated display unit comprising an array of pixels, wherein the optical output for each pixel is independently controllable; a colour filter overlay defining a colour pattern including one or more single colour areas each covering a plurality of pixels, wherein said colour filter overlay is applied to a viewing surface of said pixelated display unit and is peelable from said pixelated display unit; wherein said pixelated display unit is operable to produce regions of differing brightness within said colour pattern defined by the colour filter overlay.

According to one embodiment, said pixelated display unit is operable to change the brightness of at least one region of the colour pattern relative to at least one other region of the colour pattern.

According to one embodiment, said pixelated display unit comprises a monochromic display unit.

According to one embodiment, said colour filter overlay is applied to said viewing surface of said pixelated display unit via an adhesive.

According to one embodiment, the colour filter overlay comprises a flexible plastic film.

According to one embodiment, the force required to peel said first colour filter overlay from said pixelated display unit is no more than about 1 g per mm.

Figure 2:
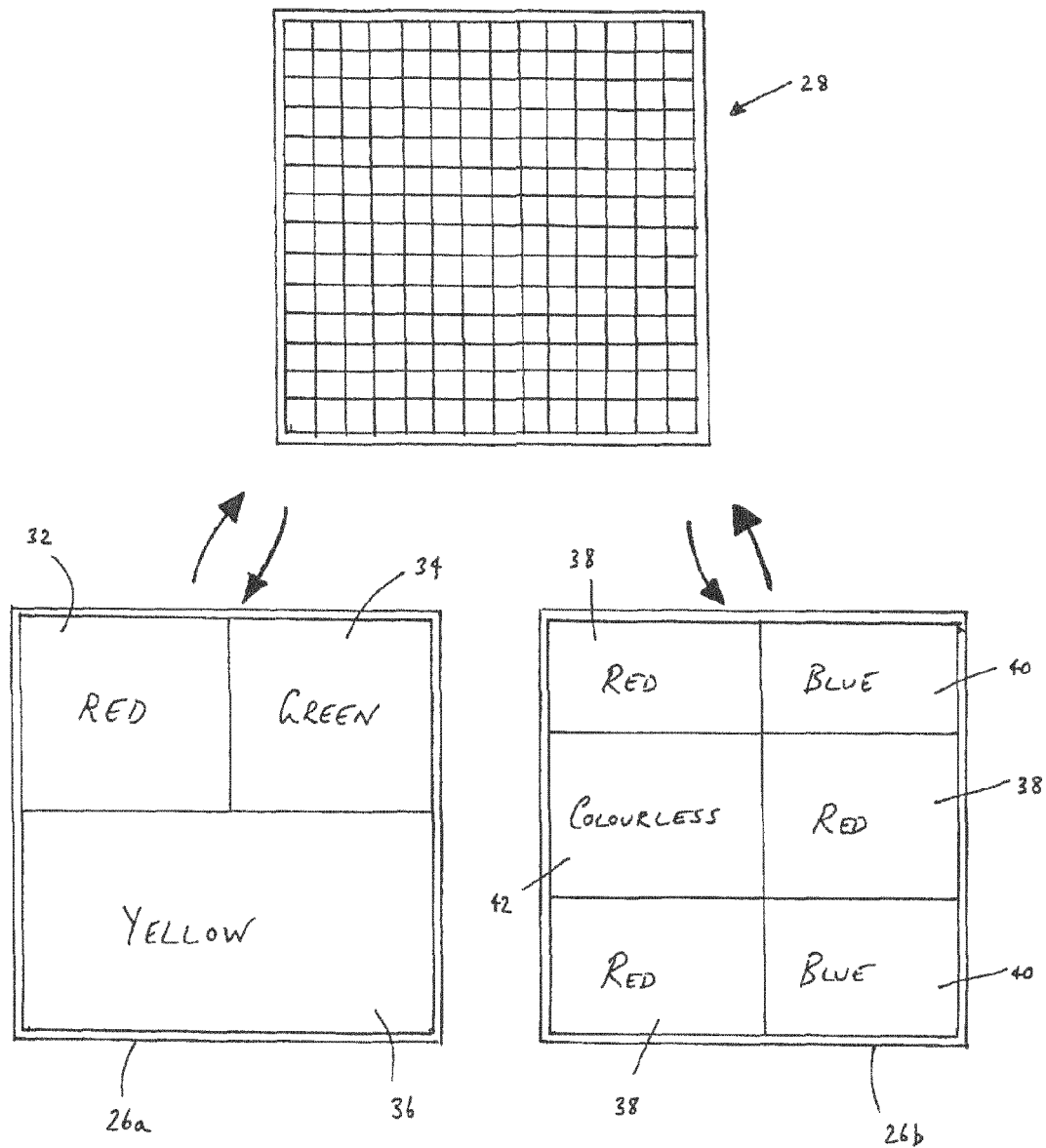
Figure 3:
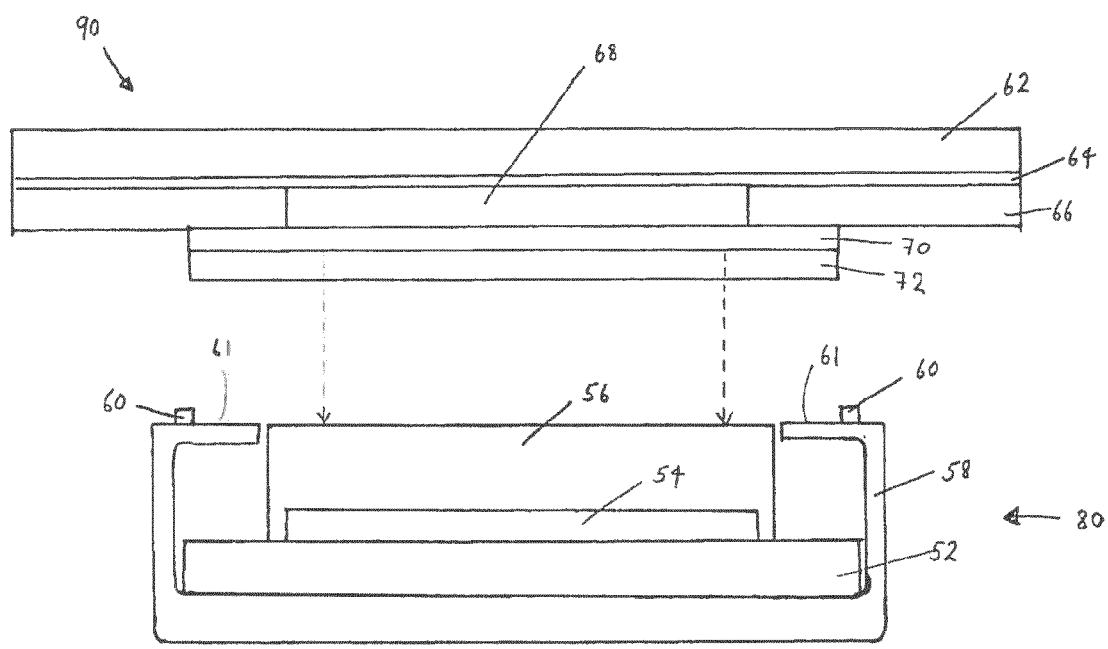

An embodiment of the present invention is described in detail hereunder, by way of example only, with reference to the accompanying drawings, in which:

FIG. 1 illustrates part of a device according to an embodiment of the present invention;

FIG. 2 further illustrates the device shown in FIG. 1, and a technique of using the device of FIG. 1 according to an embodiment of the present invention; and FIG. 3 illustrates a specific example of an implementation of the technique illustrated in FIGS. 1 and 2.

With reference to FIGS. 1 and 2, an active matrix display device according to an embodiment of the present invention includes an active matrix display unit 28 and a colour filter overlay 26 applied to the viewing surface of the active matrix display unit. The colour filter overlay 26 includes a flexible, thin plastic film (e.g. polyethyleneterephthalate (PET)) defining a colour pattern, and a non-permanent, low-strength adhesive 22 secured to the undersurface of the coloured plastic film 24, which allows the colour filter overlay 26 to be securely applied to the viewing surface of the active matrix display unit 28, whilst allowing the colour filter overlay 26 to be peeled away from the active matrix display unit without damaging the active matrix display unit in any way.

The active matrix display unit comprises: a control backplane 30 including active matrix circuitry supported by a substrate 2, such as a flexible plastic substrate; and an optical media front plane 20 permanently laminated to the control backplane 30. The strength of adhesion between the optical front plane 20 and the control backplane 30 is stronger than the strength of adhesion between the front plane 20 and the colour filter overlay 26.

The control backplane 30 comprises a patterned conductive layer defining source and drain electrode circuitry, including source electrodes 4 and drain electrodes 6 for an array of TFTs, source addressing lines each connecting the source electrodes of a respective row of TFTs to a respective terminal at the edge of the device, and drain conductors for each TFT, each drain conductor providing a conductive link from the respective drain electrode to a respective drain pad as the base for a respective interlayer connection 16 to a respective overlying pixel electrode 18. A patterned organic polymer semiconductor layer 8 forms respective semiconductor channels between the source and drain electrode pairs for each TFT. A continuous organic polymer gate dielectric layer 10 is formed over the entire area of the source and drain electrode circuitry and patterned semiconductor layer for all TFTs. A further patterned conductive layer defines an array of parallel gate lines 12, each gate line 12 providing the gate electrode for a respective column of TFTs. A continuous organic polymer insulator layer 14 is formed over all the gate lines 16, which organic polymer insulator layer insulates the gate lines 12 from the overlying pixel electrodes 18. Via-holes are formed (by e.g. laser ablation or photolithography) through the insulator layers 10, 14 down to respective drain conductors. A continuous deposit of conductive material is made over the entire exposed area of the insulator layers 10, 14 to form a conductive layer connected to the drain conductors through the via-holes. This conductive layer is then patterned into an array of pixel electrode islands, each pixel electrode island 18 connected to the drain conductor of a respective TFT. The electric potential at each pixel electrode 18 can be controlled independently by sequentially applying an on-voltage to each gate line in turn to sequentially switch columns of TFTs into an on-state, and simultaneously applying independent voltages to the array of source addressing lines. Each time a new gate line is switched on, the voltages applied to the source addressing lines are changed according to the electrical potentials required at the pixel electrodes for the TFTs associated with the new "on" gate line.

The optical media front plane 20, may for example, comprises an electrophoretic ink, whose ability to return incident light back through the viewing surface can be varied by controlling the voltage across the optical media, which in turn can be varied by controlling the electric potentials at the pixel electrodes 18. Without the colour filter overlay 26, the optical output of the display device 28 is a monochromic, black-and-white display.

The grid shown in the top part of FIG. 2 schematically represents the different regions of the optical media (pixels) whose optical output (ability to return incident light back through the viewing surface) can be controlled independently by controlling the electric potential at the respective pixel electrode 18. Only a relative small number of pixels are shown in FIG. 2, but a device for typical display purposes would comprise much larger numbers of pixels. The lower part of FIG. 2 illustrates two very simple examples of colour filter overlays 26a, 26b. The first example of a colour filter overlay 26a defines a colour pattern including a red area 32, a green area 34 and a yellow area 36. The second example of a colour filter overlay 26b defines a colour pattern including red areas 38, blue areas 40 and a colourless area 42. These areas each cover many pixels, i.e. each extend continuously over many pixels as shown in FIG. 2.

For example, each pixel covered by the red area could output red light at a desired level of brightness ranging from the lowest brightness (black) to increasing levels of brightness; each pixel covered by the colourless area could output white light at a desired level of brightness ranging from the lowest brightness (black) to increasing levels of brightness (different levels of grey up to bright white); and so on. A dynamic display could be achieved by varying the level of brightness of one or more pixels in one or more areas of the colour pattern. For example, a suitably designed colour filter overlay 26 could be used in combination with the active matrix display unit 28 to produce a dynamic image of a thermometer whose reading changes both position and colour (e.g. blue to red) as the temperature to be displayed changes. Another example involves generating different text images in one or more of the coloured areas.

The colour filter overlays shown in FIG. 1 define very simple colour patterns, but a colour filter overlay could define a much more complicated colour pattern according to the needs of the user. For example, the colour filter overlay could define a multi-colour logo.

The arrows in FIG. 2 indicate that the colour filter overlays 26 can be peeled away from the active matrix display unit 28 without damaging the active matrix display unit 28 in any way, and replaced with a different colour filter overlay 26 defining a different colour filter pattern. In this way, the colour output of one or more pixels can be easily changed, and a colour display can be reconfigured as desired using the same active matrix display unit.

As mentioned above, to facilitate the replacement of one colour filter overlay 26 with another, a low-strength, non-permanent adhesive 22 is used to secure the colour filter overlay 26 to the viewing surface of the active matrix display unit 28. For example, the adhesive 22 may be selected such that the force required to peel the colour filter overlay 26 from the viewing surface of the active matrix display unit 28 is no more than about 1 g/mm (as measured in a 90° peel adhesion test at a peel speed of 12 inches (305 mm)/min).

FIG. 3 illustrates one example of a specific implementation of the technique described above. The active matrix display unit 80 comprises a display substrate 52 such as a flexible plastic display substrate, which supports an active matrix array of TFTs and a pixelated monochromic optical media controlled by the active matrix array of TFTs. The active matrix of TFTs and optical media are designated collectively in FIG. 3 by element 54, whose upper surface area defines the active area (or driveable area) of the display unit 80. The active TFT matrix and optical media are encapsulated together on the display substrate 52 by a protective coating and/or protective film 56. The resulting structure is housed in a housing 58, which extends from behind the back of the display substrate 52, up all four sides of the display substrate 52 and partly over the display substrate 52 where it defines a frame portion 61 which frames the active area.

This display unit 80 is used in combination with a colour filter overlay 90 comprising a transparent coloured print 64 which defines a colour pattern at least in a region corresponding to at least part of the active area. The transparent coloured print 64 is sandwiched between an upper window film 62 and an opaque backing 66. The opaque backing 66 is comprised of a material that blocks the transmission of light of all visible wavelengths. The opaque backing 66 defines a window 68 that may be substantially aligned with the active area of the display unit 80, but in other embodiments may partly hide the active area of the display unit 80. The window 68 may comprise a transparent, colourless film/print whose thickness closely matches that of the opaque backing 66; this helps to planarise the back of the overlay 90 and may reduce the risk of bubbles appearing at the edges of the active area. The undersurface of the colour filter overlay is coated with a low-strength, self-wetting adhesive 70 of the kind described above, which adhesive 70 is protected by a peelable protective liner 72. In use, the protective liner 72 is peeled away, and the colour filter overlay 90 is laminated onto the display unit 80. The frame portion 61 of the housing 58 of the display unit 80 may comprise alignment features 60 to facilitate the correct application of the colour filter overlay 90 to the display unit 80.

When a different colour pattern is required, the old colour filter overlay 90 is peeled away from the display unit 80, and a new colour filter overlay 90 defining a different colour pattern (and possibly also comprising an opaque backing of a different shape and/or design) is laminated to the same display unit 80.

In addition to a controller for controlling the active TFT matrix and optical media, the periphery of the display substrate 52 (outside of the active area) may also support a wireless communication unit (such as e.g. a Wi-Fi or low power Bluetooth unit) to enable the output of the display unit 80 to be updated when the colour filter overlay is changed. The display unit 80 may also include sensors to detect the presence of a viewer of the display (such as motion, light, or heat sensors), and the active TFT matrix controller may be configured to generate an active optical output only when it is detected that there may be someone to see the display. In the case of a bistable optical media (such as an electrophoretic ink), the active TFT matrix controller may be configured to generate a change in the optical output of the display only when it is detected that there may be someone to see the display.

The opaque backing 66 may be used to make the display output of the display unit 80 appear larger than reality by adopting a design for the viewing surface of the opaque backing that enhances the the output of the display unit 80. For example, the opaque backing 66 and the transparent coloured print 64 may be printed at the same time to facilitate the seamless combination of brightly coloured static imagery and graphics provided by the opaque backing 66 with the dynamic colour output provided by the display unit 80 and the transparent coloured print 64.

The invention claimed is:

1. A method, comprising:
    providing a pixelated display unit comprising an array of pixels, wherein the optical output for each pixel is independently controllable;
    applying a first colour filter overlay to a viewing surface of said pixelated display unit, said first colour filter overlay defining a first colour pattern including one or more single colour areas each covering a plurality of pixels;
    operating said pixelated display unit to produce regions of differing brightnesses within said first colour pattern;
    peeling said first colour filter overlay from said viewing surface of said display unit;
    applying a second colour filter overlay to said viewing surface of said display unit, said second colour filter overlay defining a second colour pattern including one or more single colour areas each covering a plurality of pixels; and
    operating said pixelated display unit to produce regions of differing brightnesses within said second colour pattern.

2. A method according to claim 1, wherein said first and second colour patterns differ in colour for one or more pixels.

3. A method, comprising:
    providing a pixelated display unit comprising an array of pixels, wherein the optical output for each pixel is independently controllable;
    applying a first colour filter overlay to a viewing surface of said pixelated display unit, said first colour filter overlay defining a first colour pattern;
    operating said pixelated display unit to produce regions of differing brightnesses within said first colour pattern;
    peeling said first colour filter overlay from said viewing surface of said display unit;
    applying a second colour filter overlay to said viewing surface of said display unit, said second colour filter overlay defining a second colour pattern, wherein said first and second colour patterns differ in colour for one or more pixels; and
    operating said pixelated display unit to produce regions of differing brightnesses within said second colour pattern.

4. A method according to claim 1, wherein said operating said pixelated display unit to produce regions of differing brightness within said colour patterns comprises: operating said pixelated display unit to change the brightness of at least one region of a colour pattern relative to at least one other region of the same colour pattern.

5. A method according to claim 1, wherein said pixelated display unit comprises a monochromic display unit.

6. A method according to claim 1, wherein applying said colour filter overlays to the viewing surface of said pixelated display units comprises applying the colour filters overlays to the viewing surface using an adhesive.

7. A method according to claim 6, wherein the colour filter overlays comprise flexible plastic films.

8. A method according to claim 6, wherein the force required to peel said first colour filter overlay from said pixelated display unit is no more than about 1 g per mm.

9. A device, comprising:
    a pixelated display unit comprising an array of pixels, wherein the optical output for each pixel is independently controllable;
    a colour filter overlay defining a colour pattern including one or more single colour areas each covering a plurality of pixels, wherein said colour filter overlay is applied to a viewing surface of said pixelated display unit and is peelable from said pixelated display unit;
    wherein said pixelated display unit is operable to produce regions of differing brightness within said colour pattern defined by the colour filter overlay.

10. A device according to claim 9, wherein said pixelated display unit is operable to change the brightness of at least one region of the colour pattern relative to at least one other region of the colour pattern.

11. A device according to claim 9, wherein said pixelated display unit comprises a monochromic display unit.

12. A device according to claim 9, wherein said colour filter overlay is applied to said viewing surface of said pixelated display unit via an adhesive.

13. A device according to claim 12, wherein the colour filter overlay comprises a flexible plastic film.

14. A device according to claim 12, wherein the force required to peel said first colour filter overlay from said pixelated display unit is no more than about 1 g per mm.

* * * * *